June 15, 1965 P. R. GOULD 3,189,420
ELECTRICALLY CONDUCTIVE ELEMENT
Filed Oct. 1, 1962
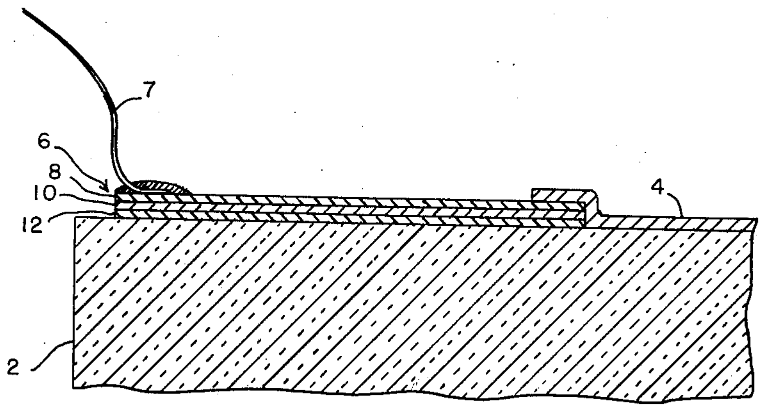
INVENTOR,
PAUL R. GOULD.
BY Harry M. Saragovitz
ATTORNEY.

United States Patent Office 3,189,420
Patented June 15, 1965

3,189,420

ELECTRICALLY CONDUCTIVE ELEMENT

Paul R. Gould, Framingham, Mass., assignor to the United States of America as represented by the Secretary of the Army

Filed Oct. 1, 1962, Ser. No. 227,616
1 Claim. (Cl. 29—195)
(Granted under Title 35, U.S. Code (1952), sec. 266)

The invention described herein may be manufactured and used by or for the Government for governmental purposes without the payment of any royalty thereon.

This invention relates to an electrically conductive element, and more particularly, to an electrical circuit contact mounted on a substrate.

The electrical circuit contact mounted on the substrate includes an electrically conductive thin film that adheres strongly to the substrate and has good solderable characteristics.

Difficulties are encountered in utilizing an electrically conductive thin film contact on glass or similar substrate. That is, metals such as manganese or aluminum, which adhere strongly to glass or similar substrate are not easily soldered. On the other hand, metals which have desirable electrical and soldering properties such as copper, silver, or gold, will not form an adherent bond to the substrate. Ideally, the electrically conductive film contact must have excellent adhesion to glass, alumina, pyroceram and similar substrates over a large temperature range. The electrically conductive film contact must also be solderable using standard techniques with little or no flux. Furthermore, the film should have negligible electrical resistance and require only one evaporation source, which can be easily fabricated and reused.

Accordingly, an object of this invention is to prepare an electrically conductive thin film contact on glass or similar substrate so that the film will have excellent adhesion to the substrate and also be solderable using standard techniques with little or no flux. A further object is to prepare the film on the substrate so that the film has negligible electrical resistance and will require only one evaporation source, which can be easily fabricated and reused.

We now find that the aforementioned objectives can be attained and the above mentioned difficulties overcome by using a binary alloy, one metal of the alloy having an affinity for adhesion, and the other metal of the alloy having an affinity for conduction and soldering. Briefly, in preparing the electrically conductive thin film contact on the substrate, vacuum deposition of a binary alloy is carried out from a single source. In the deposition of course, the metal of the binary alloy having the higher vapor pressure evaporates preferentially. One metal of the binary alloy is a metal which adheres strongly to glass or similar substrate as manganese or aluminum, and the other metal of the alloy is a metal having desirable electrical and soldering properties as copper, silver, or gold. The particular ratio in which the metals are used is dependent on the particular use, 20 percent of the adhesive metal and 80 percent of the solderable metal being an optimum mixture. Successfully used alloys include manganese-copper, manganese-silver, manganese-gold, aluminum-gold, and aluminum copper. Of the various alloys that can be used as the single source, a 20 percent manganese, 80 percent silver alloy is particularly preferred.

As a result of the preferential evaporation from the single source binary alloy, the part of the film in immediate contact with the substrate is a metal layer of a metal capable of creating a firm bond with the substrate. Ths part of the film furthest from the substrate is a metal layer of a metal capable of imparting good conduction and soldering properties to the film. The area between the aforementioned two layers of metal of the film is a layer of mixed metals, one of said mixed metals being capable of creating a firm bond with the substrate, and the other of said mixed metals being capable of imparting good conduction and soldering properties to the film.

In practice, an ingot of the desired composition is made by vacuum melting several grams of the metals. The ingot is pressed into a sheet and then cut to a convenient size which is determined by the source-substrate geometry and the desired thickness of film. The ingot is then placed in a tantalum boat which is in turn placed in a vacuum bell jar. The boat is clamped to a pair of electrodes and the whole system is pumped out. Electricity is then passed through the tantalum boat until the ingot of metal evaporates. The substrate is placed about 10 to 12 inches above the boat. Because of the geometry of the system, an even thickness of metal is produced on the substrate where desired. The film is limited by masking to those areas where it is desired to make electrical contact.

For a better understanding of the invention, reference is had to the drawing wherein there is shown a fragmentary cross-sectional view of an electrically conductive element according to the invention.

In the drawing, 2 represents a glass substrate, 6 represents an electrically conductive thin film formed on the glass substrate by vacuum deposition from a 20 percent manganese-80 percent silver alloy source held at 1050° C. This percentage refers to the amounts of metal weighed out when making the ingot. Numerals 8, 10, and 12 in the drawing refer to the three layers of the electrically conductive film. That is, 12, is a layer of manganese capable of creating a firm bond with the substrate; 10 is a layer of a mixture of manganese and silver, and 8 is a layer of silver capable of imparting good conduction and soldering properties to the film. Contacts were made from the manganese-silver alloy on the glass substrate. Copper wires 7, soldered to these contacts with standard electrical solder or indium solder could not be pulled free by ten pounds of force, either parallel or perpendicular to the surface. 4 is an associated circuit element. The total thickness of the electrically conductive thin film is about 2000 angstroms.

In general, the temperature of the single source binary alloy will be held between 1000° C. and 1300° C. during the deposition. The alloy source must be evaporated to completion (until all of the alloy has evaporated).

The thickness of the film is not critical and will depend on the source to substrate geometry, and the mass of alloy evaporated. A thickness of 1000 to 2000 angstroms could be considered as desirable for most applications.

It is intended that the foregoing description of the invention be considered merely as illustrative and not in limitation of the invention as hereinafter claimed.

What is claimed is:

An electrically conductive element comprising a glass substrate, an electrically conductive thin film covering a portion of the substrate, the part of the film in immediate contact with the substrate being a metallic layer of manganese and the part of the film furthest from the substrate being a metallic layer of silver, the area between the aforementioned two layers of metal of the film being a mixed metal layer of manganese-silver.

References Cited by the Examiner

UNITED STATES PATENTS

| | | | |
|---|---|---|---|
| 2,296,616 | 9/42 | Koller | 29—195 |
| 2,594,820 | 4/52 | Stern | 29—195 |
| 2,775,531 | 12/56 | Montgomery | 29—195 |
| 2,848,390 | 8/58 | Whitehurst | 117—126 |
| 2,876,596 | 3/59 | Kessler | 65—59 |
| 2,915,153 | 12/59 | Hitchcock | 189—36.5 |
| 2,918,596 | 12/59 | Dijksterhuis et al. | 189—36.5 X |
| 2,934,685 | 4/60 | Jones | 317—240 |

DAVID L. RECK, *Primary Examiner.*

HYLAND BIZOT, *Examiner.*